Feb. 28, 1928. V. G. APPLE. Re. 16,889

MACHINE FOR BENDING ARMATURE TERMINALS.

Original Filed Dec. 23, 1918

8 SHEETS—SHEET 1.

Witnesses:
Robert F. Freir
Arthur M. Carlson

Inventor
Vincent G. Apple
Fowler Bain & Bean
Attys.

Feb. 28, 1928. V. G. APPLE. Re. 16,889

MACHINE FOR BENDING ARMATURE TERMINALS.

Original Filed Dec. 23, 1918

8 SHEETS—SHEET 2.

Witnesses:
Robert H. Irwin
Arthur M. Carlson

Inventor
Vincent G. Apple
Fonée Bain & Bean
Attys.

Feb. 28, 1928. V. G. APPLE. Re. 16,889

MACHINE FOR BENDING ARMATURE TERMINALS.

Original Filed Dec. 23, 1918

8 SHEETS—SHEET 3.

Witnesses:
Robert J. Fuller
Arthur M. Carlson

Inventor
Vincent G. Apple
Fonée Bain & Bean
Attys.

Feb. 28, 1928. V. G. APPLE. Re. 16,889

MACHINE FOR BENDING ARMATURE TERMINALS.

Original Filed Dec. 23, 1918

8 SHEETS—SHEET 4.

Witnesses:
Robert Stevens
Arthur W. Carlson

Inventor
Vincent G. Apple
Fonée Bain Rhean
Attys.

Feb. 28, 1928.

V. G. APPLE.

MACHINE FOR BENDING ARMATURE TERMINALS.

Re. 16,889

Original Filed Dec. 23, 1918

8 SHEETS—SHEET 5.

Witnesses:
Robert T. Irwin
Arthur W. Carlson

Inventor:
Vincent G. Apple
Toné Bain & Bean
Attys.

Feb. 28, 1928. V. G. APPLE. Re. 16,889

MACHINE FOR BENDING ARMATURE TERMINALS.

Original Filed Dec. 23, 1918

8 SHEETS—SHEET 6.

Witnesses:
Robert Frier
Arthur W. Carlson

Inventor
Vincent G. Apple
Jones Bain & Bean
Attys.

Feb. 28, 1928. V. G. APPLE. Re. 16,889

MACHINE FOR BENDING ARMATURE TERMINALS.

Original Filed Dec. 23, 1918

8 SHEETS—SHEET 7.

Witnesses:
Robert H. Irwin
Arthur M. Carlson

Inventor
Vincent G. Apple
Bonée Bain & Bean
Attys.

Feb. 28, 1928. V. G. APPLE. Re. 16,889

MACHINE FOR BENDING ARMATURE TERMINALS.

Original Filed Dec. 23, 1918

8 SHEETS—SHEET 8.

Witnesses:
Robert J. Fuerir
Arthur M. Carlson

Inventor
Vincent G. Apple
Joseph Bain Rean
Attys:

Reissued Feb. 28, 1928. Re. 16,889

UNITED STATES PATENT OFFICE.

VINCENT G. APPLE, OF DAYTON, OHIO.

MACHINE FOR BENDING ARMATURE TERMINALS.

Original No. 1,332,154, dated February 24, 1920, Serial No. 268,021, filed December 23, 1918. Application for reissue filed July 12, 1927. Serial No. 205,261.

One of the objects of my invention is to provide a power driven tool, by means of which the terminal ends of armature conductors, at one or both ends of the core, may all simultaneously and uniformly be bent into respective positions, in appropriately disposed pairs, one or both ends of which may then be connected to commutator segments.

Another object of my invention is to provide a tool, and means for adjusting it, so that the extent to which the terminals are displaced will be automatically determined to the end that the operation consecutively performed on a series of like armatures may quickly and accurately be accomplished.

The present invention provides means whereby certain power driven instrumentalities are employed to carry into effect the object sought in Letters Patent No. 1,238,959, granted to Edward J. Tomlinson for a terminal bending tool for armatures, September 4, 1917, and for making armatures, substantially as shown in my copending application Serial No. 139,753, filed December 30, 1916, wherein the conductor bars project from each end of the core and which bars are intended to be subsequently bent to their respective positions and suitably paired prior to being joined together, as by welding or otherwise, and in which either of the series of ends may be connected to respective commutator sections.

Bar wound, or single turn armatures, in which the conductor terminals are bent from axial position into new circumferentially directed planes to form appropriate pairs for connection with the respective segments of armature commutators, require the services of relatively highly paid experts to accomplish this operation, when such work has been done by hand, as heretofore, and when each of the terminal wires is separately manipulated.

The armature terminal ends must be bent uniformly without vertical deviation from their initial axial planes, so as not to occupy any greater space in the aggregate, in their deflected positions, than when in their initial axial positions, to economize end room and to avoid danger of short-circuiting.

It requires a great deal of power to bend all of the terminals of an armature at one time, but in doing so, the time required for the purpose is materially shortened and uniformity of results is produced.

In my present invention I provide a machine that is capable of accurate and sufficient adjustment for the purpose and which is powerful enough to bend all of the terminals of an armature at one end, or at both ends, at the same time and so arranged that when the bending act has been performed, as desired, the bending operation may be automatically or manually stopped, after which the armature which previously had substantially straight bars projecting from the ends of the core, may be replaced by another similar one upon which the desired operation is to be formed, so that when the armature comes from the machine, the ends are in place to be joined together.

Other and further and more specific objects of my invention will become readily apparent, to persons skilled in the art, from a consideration of the following description when taken in conjunction with the drawings, wherein.

In all the views the same reference characters are employed to indicate similar parts.

Figure 1:
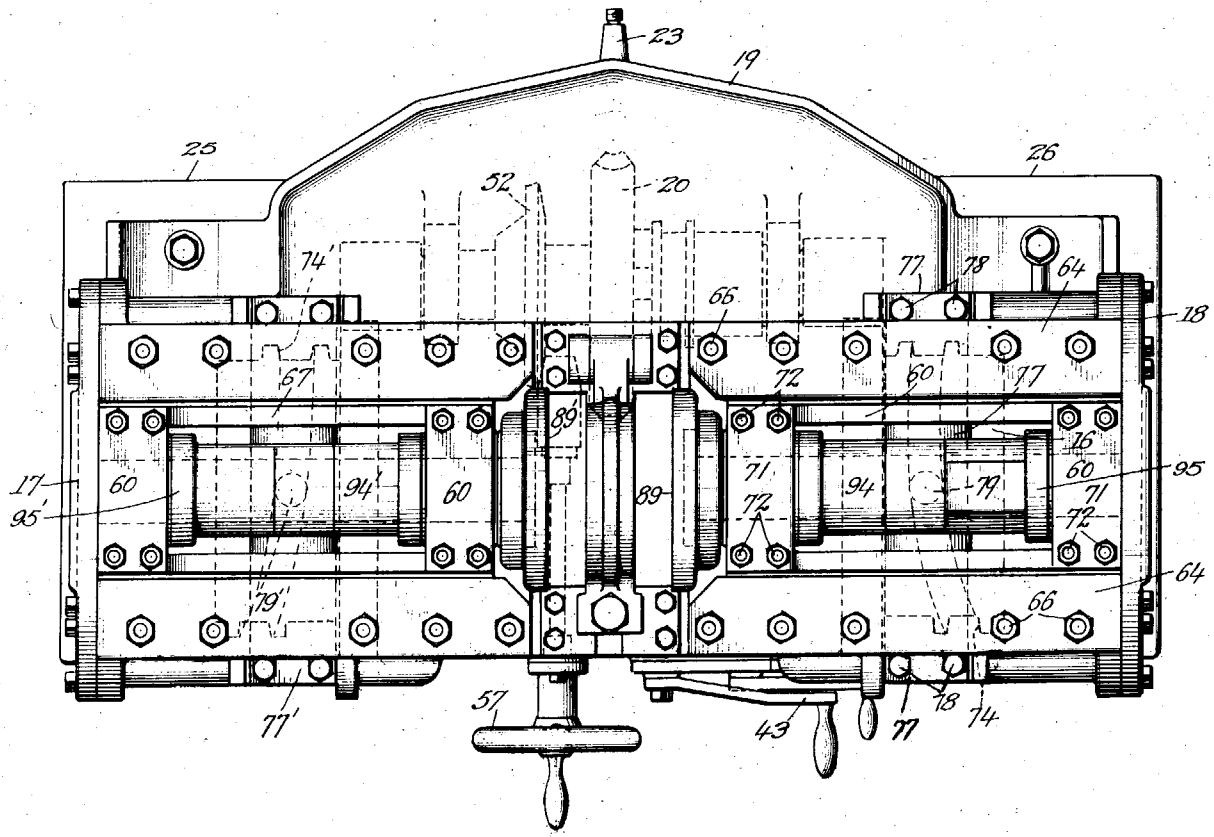
Fig. 1 is a plan view of the machine.
Figure 2:
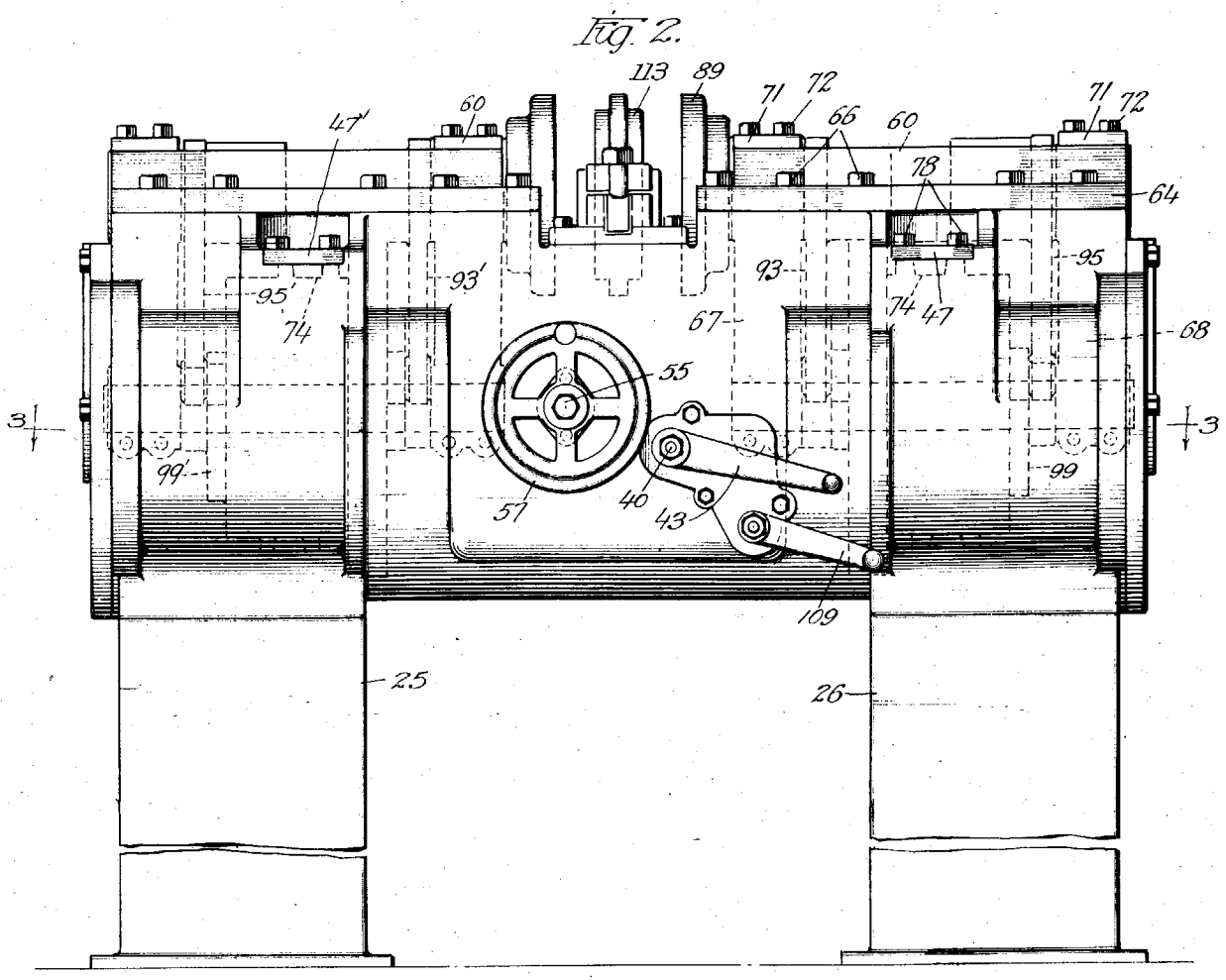
Fig. 2 is a side elevation of the machine showing the side upon which the controlling mechanism is located.
Figure 3:
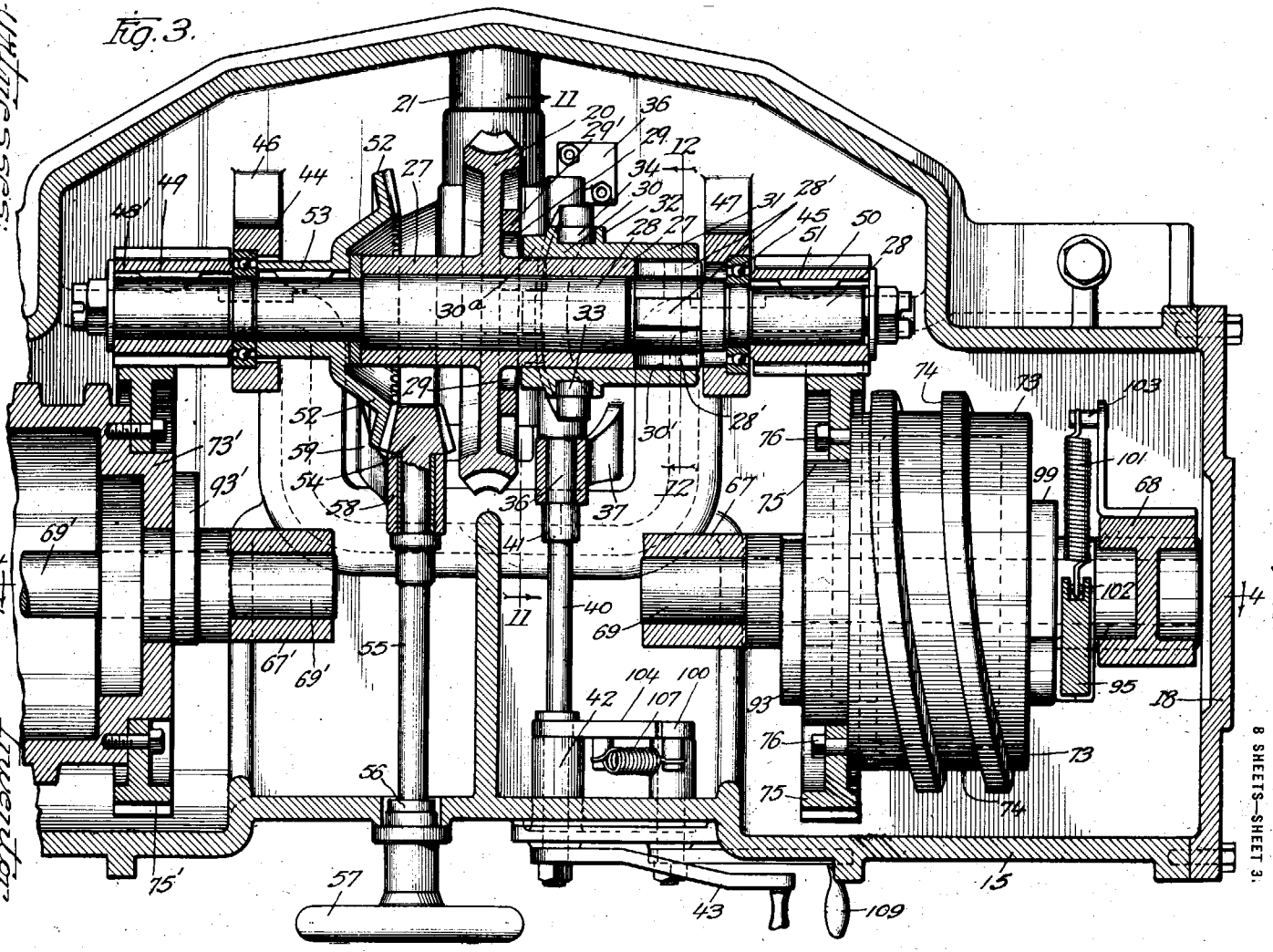
Fig. 3 is an enlarged section taken on line 3—3 of Fig. 2.
Figure 4:
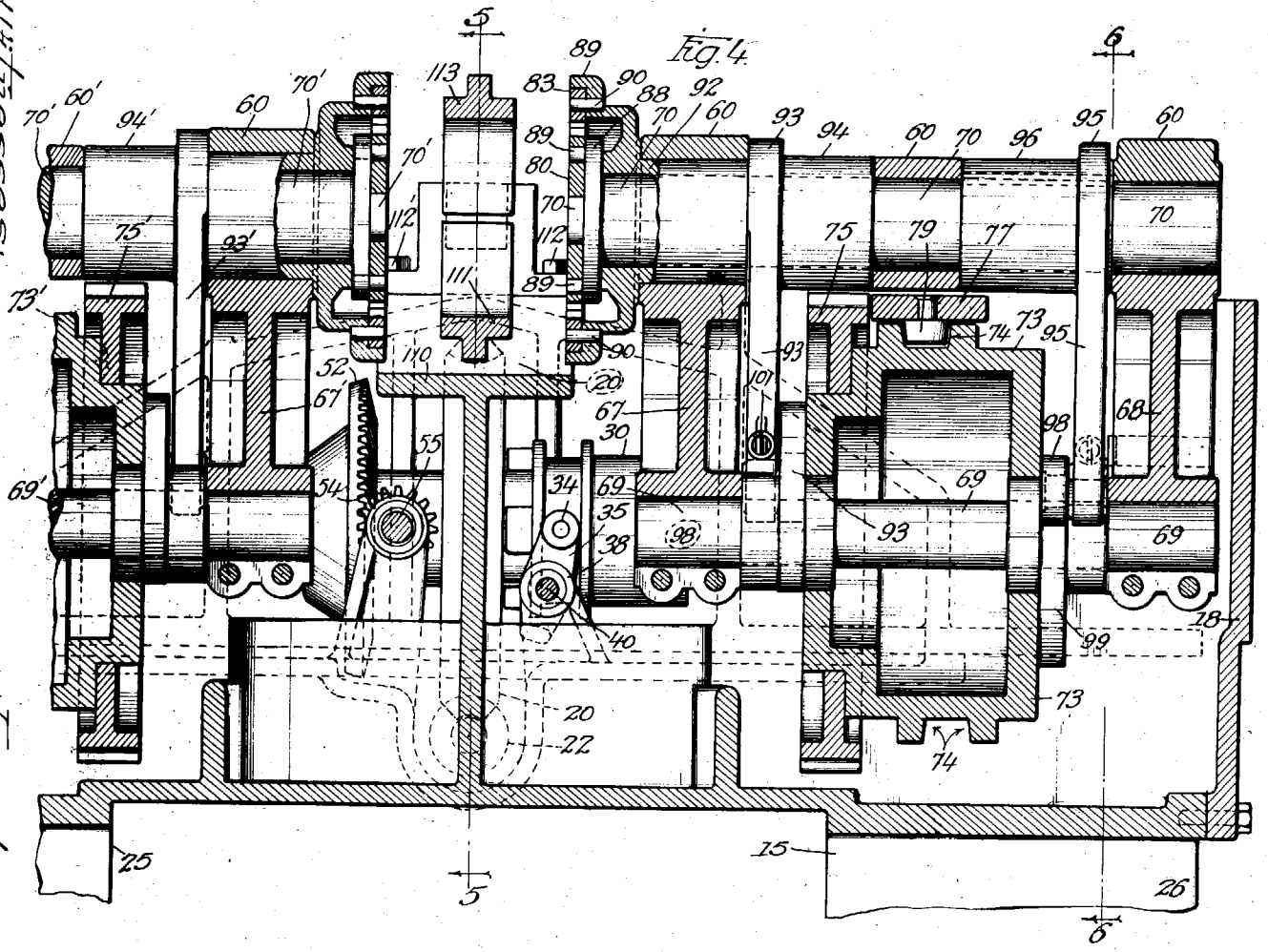
Fig. 4 is a section taken on line 4—4 of Fig. 3.
Figure 5:
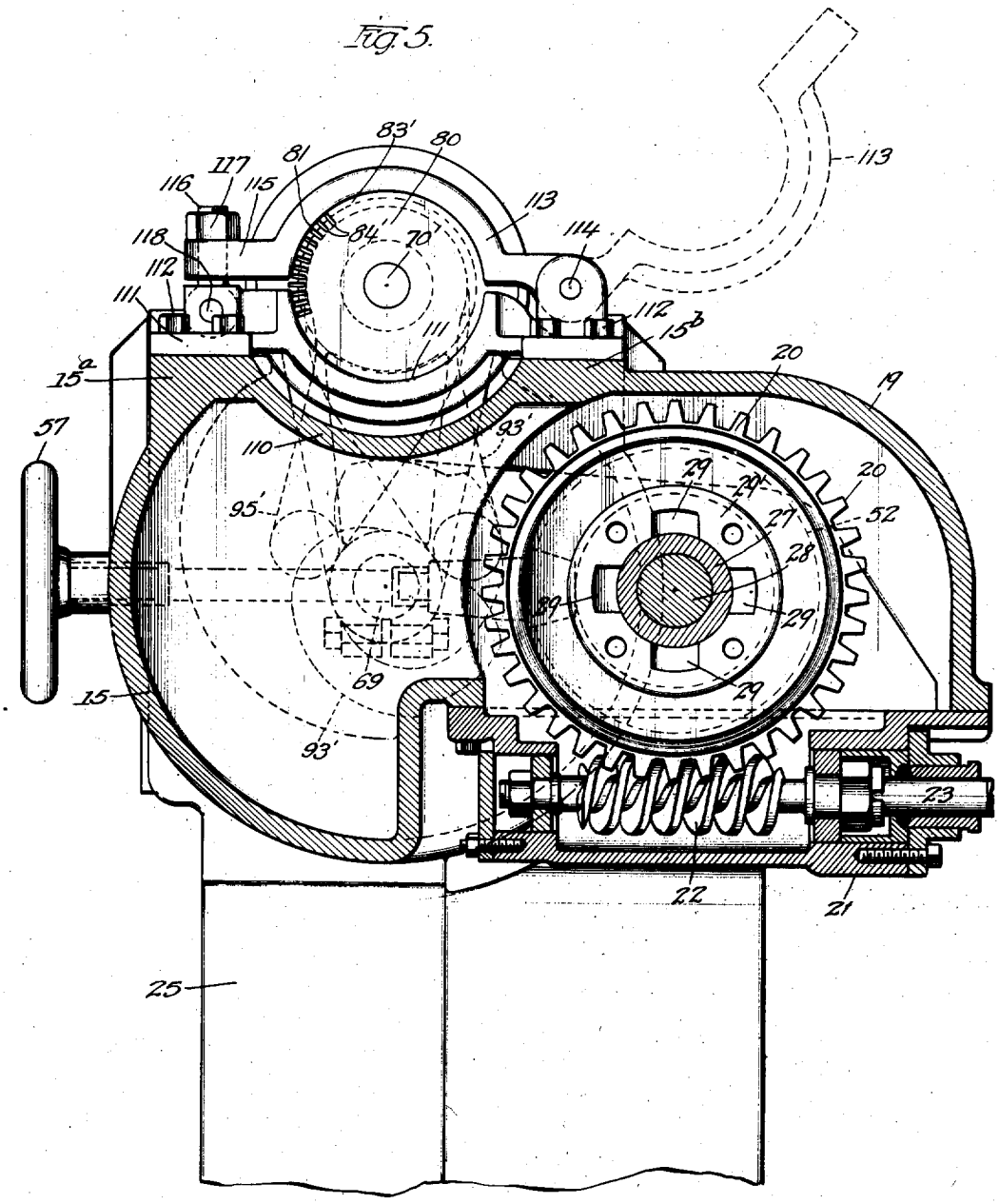
Fig. 5 is a transverse section taken on line 5—5 of Fig. 4.

A more or less cylindrical frame 15 is open along its top surface, as at 16, and is provided at its ends with removable heads 17 and 18. The frame is laterally enlarged, as at 19, to contain the driven worm wheel 20, and to the bottom of the enlarged portion 19 is bolted a casing 21 in which the driving worm 22 which rotates the wheel 20 is contained. The extended end 23 is the driving shaft thru which power is to be applied to the machine. For convenience of operation the frame is mounted upon pedestals 25 and 26.

Figure 12:
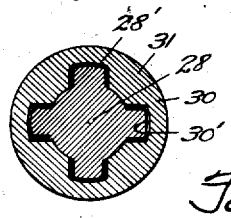
Fig. 12 is a transverse section taken on line 12—12 of Fig. 3.

The worm wheel 20 is provided with an elongated hub 27 which is normally loose on the shaft 28. It is also provided with four apertures in the disk 29′ comprising a four jawed clutch member 29. The cooperating clutch member 30 is slidable upon a shaft 28 and the elongated hub 27 thereof is prolonged into a sleeve 31. It is provided with four cooperating clutch members 30ª which enter the openings 29 near the hub 27 of the wheel 20 when the two clutch members are connected together for the purpose of driving the shaft 28. The shaft is enlarged laterally to provide four lateral projections 28′, as shown in Fig. 12—that engage openings 30′ in the sleeve 31. By this means the clutch members 29 and 30 connect the worm wheel 20 with the shaft 28. The sliding clutch member 30 is laterally enlarged, as at 32, which enlargement contains an annular groove within which the yoke ends 33 and 34, of the yoke 35, project, for the purpose of laterally moving the clutch member 30 along the shaft 28 to connect and disconnect the clutch members when it is desirable to rotate or stop rotation of the shaft 28. A shaft 36 supports the yoke member 35, and finds bearings at its respective ends in the standards 37 and 38, which are supported in the enlargement 19, of the frame 15. The end 36 of the shaft is squared, as at 39, for a socket shaft 40. The socket 41, of the shaft 40, engages the squared end of the shaft 36 and finds bearing 42 in the frame 15. The shaft 40 is adapted to be oscillated by the operating handle 43, whereby the clutch members 29 and 30 are adapted to be brought into engagement or from engagement, in accordance with the direction in which the handle 43 is moved. This feature of the apparatus will be more fully described hereinafter.

Bearing rings 44 and 45, near the outer ends of the shaft 28, are supported in the standards 46 and 47, respectively. An elongated pinion 48′ is secured to one end of the shaft by the key 49 and a similar pinion 50 is secured to the other end of the shaft, by a key 51.

A beveled gear wheel 52 is secured to the shaft 28, by a key 53, and a bevel pinion 54, meshes with the teeth of the bevel gear wheel. A shaft 55 is supported in the frame near its outer end, as at 56, and on the outer end it is provided with a hand wheel 57.

Near its inner end it is supported by a bearing 58 of the standard 59, so that the shaft 28 may be rotated, by rotation of the hand wheel 57, for a purpose hereinafter more fully explained.

The shaft and gear wheels which I have heretofore explained, to which power is applied for driving the machine, are bodily stationary. On either side of the longitudinal center of the machine are longitudinally movable heads 60 and 60′. As these heads and the parts attached thereto are substantially duplicates, I will describe one head, referring to it and its parts by reference characters and to similar parts in the other head by the same characters with the addition of the exponent prime (′). The head 60 is provided with laterally extending guides 61 and 62, which slide upon the flat surfaces 63 of the frame that bounds the opening 16 of the frame 15. A gib plate 64 is secured to the part 65 by a series of screws 66, to permit free axial movement of the head in the guides thus afforded. Depending from the head 60, at each end, respectively, are spaced apart arms 67 and 68, which afford bearings for a shaft 69. In the head 60 is a shaft 70. The half boxes 71 are secured to the head 60 by bolts 72 to afford bearings for the shaft 70, and to hold it in place on the head.

Suitably fixed to the shaft 69 is a drum cam 73, having a circumferentially extending spiral groove 74 in its outer surface. The spur gear wheel 75 is fixed to the drum 73, by bolts 76. The gear wheel 75 meshes with the spur gear pinion 50, on the drive shaft 28. The pinion 50 is elongated so that the gear wheel 75 may be moved axially thereof without being out of mesh therewith.

Fixed to the frame 15 is a cross bar 77, secured thereto by bolts 78 and which carries at its mid-portion a roller 79 that projects into the groove 74 of the drum cam 73. Now inasmuch as the cross bar 77 is fixed to the frame, it will be apparent that when the shaft 69 is rotated thru the instrumentality of the shaft 28, the pinion 50 and the gear wheel 75, that the head 60 and the connecting mechanism including the spiral cam 73, shafts 69 and 70 will be axially moved with the head and the arrangement is such that the shafts 69 and 69′, 70 and 70′ will be moved toward each other in one cycle of their operation and away from each other in the other cycle of operation, or in other words, when the drums 73, 73′ are rotated in a manner described, one rotation of the shafts 69, 69′ will serve to move the respective heads toward each other and from each other, for a purpose to be hereinafter more fully described.

Figure 7:
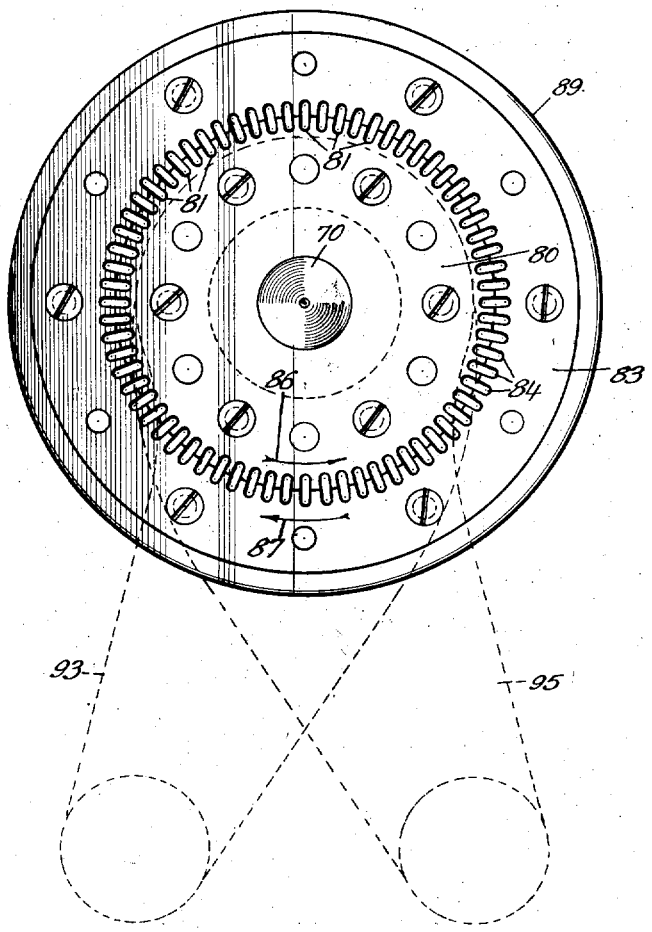
Fig. 7 is an enlarged view of a pair of the terminal bending plates or members.
Figure 8:
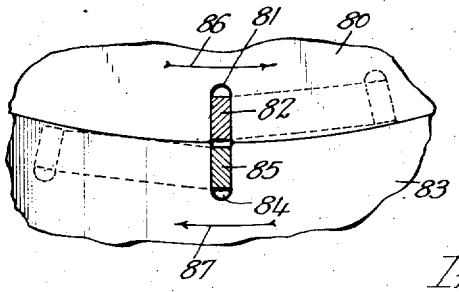
Fig. 8 is a fragment of a pair of the bending members showing a pair of armature terminals in place and the extent to which they are displaced in the finished bends.

Secured to the inner end of the shaft 70 is an armature terminal bending member 80. The rotatable plate or member 80, more fully shown in Figs. 7 and 8, is provided with a series of grooves 81 in the periphery, properly spaced apart, to contain terminals 82 of an armature. Concentrically arranged with the bending member 80 is another bending plate or member 83, having a corresponding number of grooves 84 for containing armature terminals 85. The grooves in the members 80 and 83 are alike in number and are correspondingly uniformly spaced apart. The bending members 80 and 83 are to be oscillated in opposite direction as shown by the corresponding arrows 86 and 87. The member 80 is preferably in the form of a disc or plate that may be removably secured to the head 88, on the end of the shaft 70, as by pins 89, or otherwise, and the bending member 83 is preferably a flat ring that may be secured to the head 89, as by pins 90, or otherwise, and these members may be replaced with other pairs of members having different numbers and sizes of slots with arbitrary spacings to correspond with the windings of the armature, or the size of the bars constituting the electrical conductors placed upon the armature core.

Figure 6:
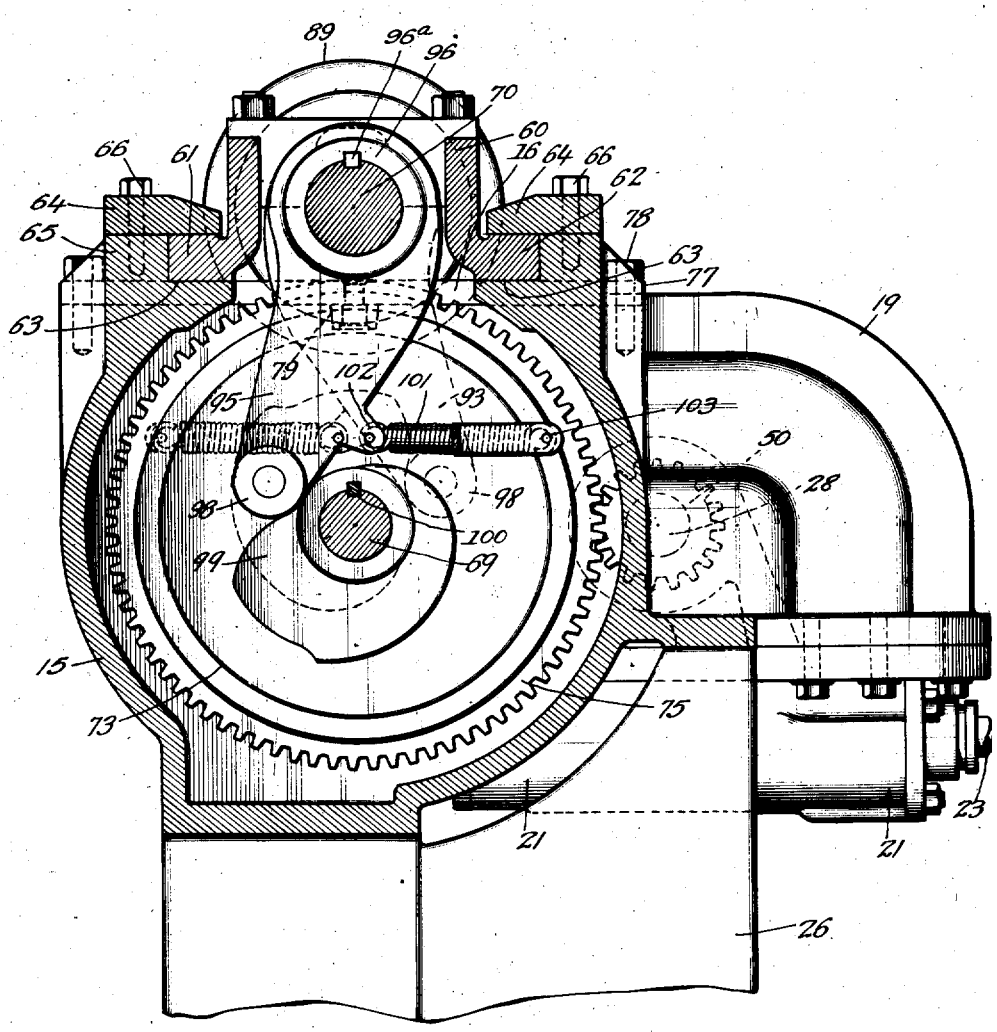
Fig. 6 is a transverse section taken on line 6—6 of Fig. 4.

The head 89 is extended rearwardly into a sleeve 92, on which is mounted and to which is secured a downwardly depending lever 93, having an integral hub 94. A similar lever 95 having a hub 96, is suitably secured directly to the shaft 70. The lever 93 bears upon one side of the shaft 69, the lever 95 on the other side, as more clearly shown in Figs. 6 and 7. The levers 93 and 95 are each provided on their free ends, with rollers 98, and each bears upon the outer surface of their respective right and left hand cams 99. These cams are each secured to the shaft 69 by a suitable key 100. Now it will be manifest that when the shaft 69 is rotated, the shaft 70 and head 89 will be oscillated by the instrumentality of the cams 99 and the levers 98. The shaft 70 will by this means be oscillated in one direction, while the bending head 89 will be rotatably oscillated in the opposite direction, as shown by the arrows 86 and 87, in Fig. 7. Since the rotation of shaft 69 causes drum cam 73 and cams 99 to operate together, it is obvious that when the bending members 80 and 83 are rotated, they are at the same time moved axially toward the armature, and that this movement causes grooves 81 and 84 to move toward the armature in helical paths, carrying the ends of terminals 82 and 85 with them to new positions. A spring 101, one for each lever, has one of its ends 102 fixed to the lever and the other end, secured to a fixed part 103 of the frame, so that the rollers 98 will always be yieldingly held in contact with the face of the respective cams 99.

Figure 9:
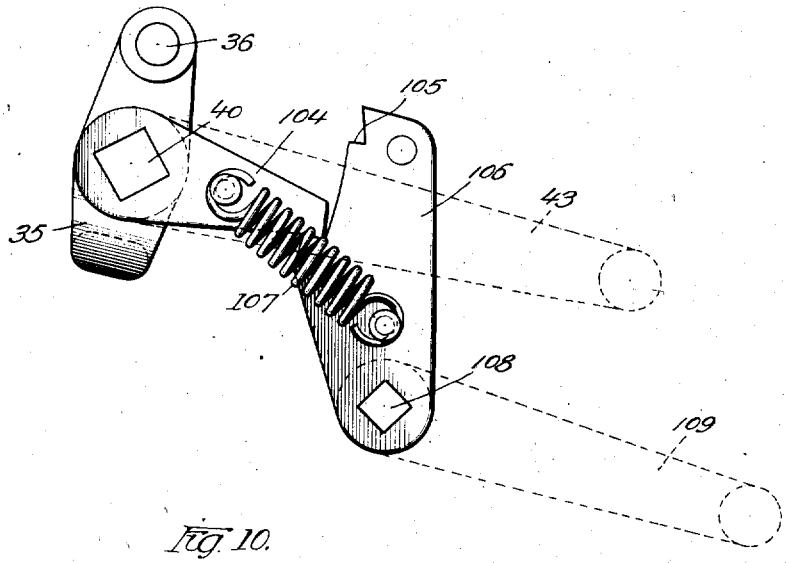
Fig. 9 is a trigger mechanism for stopping the machine in association with the clutch closing means.
Figure 10:
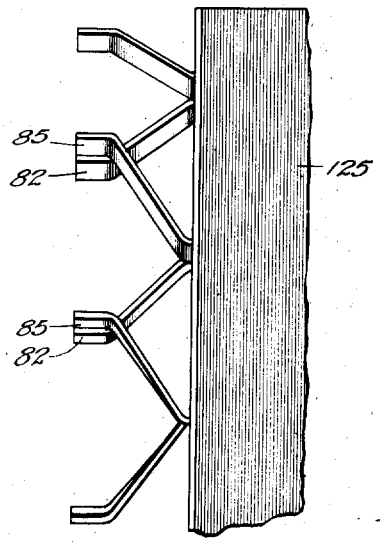
Fig. 10 is a fragment of an armature core showing one set of terminals projecting from one end thereof and the manner in which they are placed in pairs.
Figure 11:
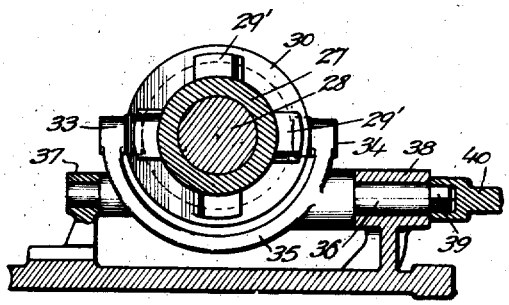
Fig. 11 is a transverse section taken on line 11—11 of Fig. 3.

The handle 43, controls the clutch members 29 and 30, by means of which the gear wheel 20 is caused to revolve the shaft 28, and when in the position shown in Fig. 9, the said clutch members are disconnected. When the handle 43 is moved, for the purpose of connecting the clutch members in order that the shaft 28 may be rotated and thus drive the bending members, the lever 43 is raised until the dog 104 engages the shoulder 105, on a latch member 106. By this means the yoke member 35 is swung on the shaft 36, thus bringing the clutch members into driving relation. The end of the dog 104 will rest on the shoulder 105, being held there by the spring 107, and so long as this trigger mechanism occupies the position described, the shaft 28 will be rotated. The latch member 106 is pivoted, as at 108, and to this pivot is attached another handle 109 by which the latch member 106 may be moved. When the bending members have been rotated to the desired or proper position, in the manner described, the latch lever 109 may be manually depressed, whereby to withdraw the latch 106 from contact with the dog 104, and thereby the spring 107 will move the clutch members automatically to open position to stop the machine. It is within the skill of an ordinary mechanic to arrange means for automatically moving the latch lever 109 to accomplish this function, but for the purpose of clearness I have omitted such an apparent constructive modification from the drawings.

Midway of the frame 15 and below the horizontal opening in the upper surface thereof, is an integral bridge member 110, preferably in the shape of an inverted arch, joining the sides of the frame 15 together for greater strength, at this point. A curved armature clamping member 111, is fixed to the sides 15[a] and 15[b] by screws 112. At one end of the clamping member 111 is pivoted a cooperating clamping member 113, as at 114, the other end 115 being held in place in cooperation with the corresponding clamping member 111, by means of a bolt 116, and a nut 117, the bolt being pivoted, as at 118, to the lower clamping member 111. Between these clamping members the armature core 125 with the straight bars projecting from one or both of its ends, is supported. The ends 82 and 85, of the armature, constituting the conductors that are to be bent into proper positions and to be joined in appropriate pairs are included in the respective apertures 81 and 84 of the bending members 80 and 83.

In order to secure proper register of the terminals with the apertures in the bending members, the shaft 28 may be turned by hand, thru the instrumentality of the gear wheel 52, the bevel pinion 54, the shaft 55 and the hand wheel 57, before the clutch members 30 and 31 are brought into operative association.

After the terminals of a given armature have been bent to the extent and into the positions desired, it may be removed from the machine and another armature with straight terminals placed therein, whereupon the machine may again be put thru its cycle of operation.

While I have herein shown a single embodiment of my invention for the purpose of clear disclosure it is manifest to persons skilled in the art that changes may be made in the general arrangement and configuration of the parts within the scope of the appended claims.

Having described my invention, what I claim is:—

1. A machine having in combination, means for holding an armature having axially projected terminals; two independently rotatable parts, each part provided with a plurality of armature-terminal-engaging means, and power means, to move said terminal-engaging means to circumferentially displace said terminals and means for controlling the power means.

2. A machine having in combination, means for holding an armature having axially projecting terminals, two independently rotatable parts, each part provided with a plurality of armature-terminal-engaging means, said means, on the two parts, being revoluble in opposite directions; power means to move the said terminal-engaging means to circumferentially displace the said terminals and means to stop the rotation of said rotatable means.

3. A machine having in combination, means for holding an armature having axially projecting terminals at each of its ends; two independently rotatable parts at each end of the armature, each part provided with a plurality of armature-terminal-engaging means, and power means for simultaneously moving said terminal-engaging means to circumferentially displace the terminals to form appropriate pairs thereof and means for controlling the power means.

4. A machine having in combination, means for holding an armature having axially projected terminals at each of its ends; two independently rotatable parts at each end of the armature, each part provided with a plurality of armature-terminal-engaging means for engaging the respective terminals; power means to simultaneously move said terminal-engaging means to circumferentially displace the terminals to form appropriate pairs thereof and means to stop movement of the rotatable parts.

5. A machine having in combination, means for holding an armature having axially projecting terminals; two independently rotatable parts, each part provided with a plurality of armature-terminal-engaging means, said means on the two parts being revoluble in opposite directions; power means to move said terminal-engaging means to circumferentially displace said terminals and means to stop movement of said rotatable parts.

6. A machine having in combination, means to hold an armature having axially projecting terminals; a head containing a terminal-engaging part rotatable in one direction; another head, containing a terminal-engaging part rotatable in the opposite direction; power driving means to rotate said heads; means for connecting said heads to said driving means; a latch to maintain the connection and a spring and connection to actuate said means to disconnect the heads from said power driving means when the latch members are disengaged.

7. A machine having in combination, means to hold an armature having axially projected terminals; a head containing a terminal-engaging part rotatable in one direction; another head, containing a terminal-engaging part rotatable in the opposite direction; power driving means to rotate said head; means to move the heads toward the armature while being rotated; and means for connecting said heads to said driving means.

8. A machine having in combination, means to hold an armature having axially projecting terminals; a head containing a terminal-engaging part rotatable in one direction; another head containing a terminal-engaging part rotatable in the opposite direction; power driving means to rotate said heads; means to move the heads toward the armature while being rotated; means for connecting the said heads to the said driving means, and means to quickly disconnect said driving means and heads when the armature terminals have been circumferentially displaced by the said heads.

9. A machine having in combination, means to hold an armature having axially projected terminals; a head containing a terminal-engaging part rotatable in one direction; another head containing a terminal-engaging part rotatable in the opposite direction; means to adjust the heads with respect to the terminals; power driving means to rotate the said heads; means to move the heads toward the armature while being rotated; means for connecting the said heads to the said driving means and means to quickly disconnect said driving means and heads.

10. Apparatus for bending the ends of bar conductors extending thru the slots of an armature core, certain conductors being lccated in the slots nearer to the axis of the core than others, the inner conductor ends being disposed in a circular row and the outer conductor ends in a circular row concentric with the inner row, which comprises, in combination, two coaxial rotatable members provided with concentric rows of notches adapted respectively to receive the rows of conductor ends, means for rotating said members in opposite directions, means for causing one member to move axially while rotating, and means causing this member to impart axial movement to the other member.

11. In a machine for forming integral end connecting portions for a bar winding by bending the ends of the concentric rows of straight bars where they extend beyond the core of a dynamo electric machine element at both ends thereof, the combination of a means for holding the core against rotative and axial movement, a bar engaging means for the end of each bar at each end of said core, power driven means for moving said bar engaging means in helical paths toward said core to appropriately bend said bars to form said end connecting portions and means to start and stop said power driven means.

12. For bending leads on a plurality of bar conductors extending from the slots of a dynamo electric machine core, apparatus comprising means for holding the core against rotative and axial movement, a bar engaging means for each bar at the end of the core, power driven means to simultaneously move the said bar engaging means in helical paths toward said core to appropriately bend said bars and means to start and stop said power driven means.

13. A machine for forming leads by bending the ends of conductor bars extending from the end of a dynamo electric machine core in two concentric rows, said machine comprising, in combination, means to hold the core against rotative and axial movement, two concentric rows of end engaging means adapted respectively to engage the rows of conductor ends, power driven means to move the rows of end engaging means in helical paths toward said core, the one row helically opposite the other row, to appropriately bend the conductor ends, and means to start and stop said power driven means.

14. In a machine for forming leads by bending the straight ends of conductor bars which project thru and axially beyond the end of a dynamo electric machine core, the combination of a means to hold the core against rotative and axial movement, an engaging means for the end of each and every bar, power driven means to move said engaging means in helical paths toward said core to appropriately bend said bars to form leads thereof, and means to start and stop said power driven means.

15. A machine for forming the end connecting portions of a bar winding integral therewith, by bending the ends of the concentric rows of straight bars where they extend beyond both ends of a dynamo electric machine core, said machine comprising, in combination, a bar engaging means for the end of each bar at each end of said core, power driven means for moving said bar engaging means in helical paths toward said core to appropriately bend said bars to form said end connecting portions and means to start and stop said power driven means.

16. In a machine for bar winding a dynamo electric machine core having its winding apertures filled with a plurality of straight bars which extend beyond the core at both ends, the combination of means for holding the core against rotative and axial movement, notched members at each end of the core and in axial alignment therewith adapted to receive the ends of said bars in said notches, and means to move the notches of said members at each end of said core in helical paths toward said core to helically dispose the straight ends of the bars.

17. In a machine for bending the ends of bar conductors extending from the slots of a dynamo electric machine core in two annular rows, the one row within the other row, the combination of means for holding the core against rotation, two coaxial independently rotatable heads each having notches adapted to engage the ends of one said row of bars, means to simultaneously rotate said heads to bend the bars, the end of any bar being circumferentially displaced relative to that portion of the same bar which is contained in the core slot, power means to simultaneously operate said heads and means to connect and disconnect said power means.

In testimony whereof I hereunto set my hand, this 28th day of May 1927.

VINCENT G. APPLE.